United States Patent [19]
Dethloff

[11] Patent Number: 6,049,788
[45] Date of Patent: Apr. 11, 2000

[54] SYSTEM WITH PORTABLE TERMINAL AND DATA MEDIA CONNECTABLE THEREWITH

[76] Inventor: Juergen Dethloff, Elbchaussee 177, D-22605, Hamburg, Germany

[21] Appl. No.: 08/862,761

[22] Filed: May 23, 1997

[30] Foreign Application Priority Data

May 7, 1997 [DE] Germany ............................ 197 19 275

[51] Int. Cl.⁷ ...................................................... H04L 9/00
[52] U.S. Cl. .................................. 705/55; 705/65; 705/67
[58] Field of Search ................................. 380/23; 705/55, 705/65–67

[56] References Cited

U.S. PATENT DOCUMENTS

| | | | |
|---|---|---|---|
| 4,450,535 | 5/1984 | de Pommery et al. | 380/23 |
| 4,742,351 | 5/1988 | Suzuki | 380/23 |
| 4,802,218 | 1/1989 | Wright et al. | 380/23 |
| 4,864,618 | 9/1989 | Wright et al. | 380/23 |

*Primary Examiner*—Salvatore Cangialosi
*Attorney, Agent, or Firm*—Notaro & Michalos P.C.

[57] ABSTRACT

Portable data media are known of which many have the uniform format of a standardized credit card and which are used in different ways for monetary transactions, preferably for the cash-less payment of services. Small portable terminals are also known which can be used together with such data media in order to display for example the contents of specific memories in the data medium or also to execute specific operations in the data medium. As a function of the application purpose of the data medium many diverse functions are desired. In order to avoid that for diverse functions, respectively for different data media with the most diverse applications, a special terminal must be used in each instance, it is suggested according to the invention to provide the terminal with further receiving means for a second data medium which comprises a control circuit cooperating with the terminal. The control circuit of the terminal in that case can have a very simple structure; more complex operations are then controlled by the second data medium. In particular, a unique irreversible assignment exists of a first data medium with for example monetary functions and a specific second data medium so that only the two together can be used, however, with any desired terminal. The use of a second data medium has further the advantage that the same terminal can be used for the most diverse applications thereby that in the terminal several second data media can be received and the second data medium provided for the desired application is inserted into the terminal.

20 Claims, 3 Drawing Sheets

SYSTEM WITH PORTABLE TERMINAL AND DATA MEDIA CONNECTABLE THEREWITH

FIELD AND BACKGROUND OF THE INVENTION

The present invention relates to a system with portable data media with decentralized verification of inputs and outputs as well as transfer of data and memory contents of data, completed under security via a user-controlled interface. Such a system uses a portable terminal which has a receiving means for a portable data medium, in particular a bank card, and it is possible to execute with the terminal different operations with the data medium. For this purpose the data medium comprises at least one control circuit and an electronic memory. The simplest function is the display of the memory content, that is the content of specific memory locations for which purpose, apart from means for establishing an operative connection with the data medium, the terminal comprises also a display device and an energy source. The operative connection can comprise contacts, but connection can also be realized free of contacts via an electric or electromagnetic field. In the case of a bank card or a telephone card, a sum of money available on the card or a number of available value units can be displayed in this way. Furthermore, small portable terminals are known which, apart from the display device, also comprise control elements in the form of buttons and, through specific actuations of the buttons, data on a data medium connected with the terminal can be changed, for example they can be moved, for example, from one storage location to another.

The European Patent Application 97 100 003.9 describes a data medium which comprises at least two memories or memory locations, wherein into one of the memories data representing, in particular, sums of money, can only be written and from at least one further memory sums of money can only be removed, that is, debited. In order to transfer, in the case of such data medium, sums of money, respectively corresponding data, from the write-only memory into the at least one debitable memory, the data medium is connected with a small portable terminal which comprises an energy source, a display device and control elements, which for such transfer must be operated in a predetermined manner. The terminal is therein advantageously and uniquely assigned to a specific data medium, which assignment can be verified by comparing check data stored in the data medium and in the terminal. This has the advantage that a finder or a thief of such data medium cannot dispose of the amount of money stored therein if he or she does not also have the associated terminal. Establishing such fixed assignment between data medium and terminal, however, is not always easy. For example, the site which issues the data media can also supply the terminal, and both must be correspondingly programmed before they are issued. But such programmability is complicated especially for the terminal. Still more difficult is establishing the assignment if the terminal is to be issued independently of the data medium. In addition, the terminal, as a function of the desired application of the data medium, must comprise a more or less complex control circuit for carrying out data changes in the data medium so that for different types of data media also different terminals are required.

SUMMARY OF THE INVENTION

It is the task of the present invention to specify a portable terminal with receiving means for connection with a data medium, which is simple to manufacture and applicable to the most diverse data media for different applications, with a unique assignment between data medium and terminal being establishable if required.

To solve this task, a portable terminal with receiving means for establishing an operative connection with a first data medium comprising an electronic control circuit and storage means, with control elements, with display elements and with a control circuit with the capability of carrying out predetermined operations, in particular after actuation of the control elements to transmit commands or data via the operative connection to a first data medium inserted in the receiving means and to receive data from the first data medium and to transfer selected data to the display elements; is provided with further receiving means for a second data medium. The second data medium also comprises an electronic control circuit, storage means and an interface for establishing an operative connection between the control circuit and the storage means of the second data medium and the control circuit of the terminal. The control circuit of the second data medium has the capability of cooperating with the control circuit of the terminal in order to carry out additional operations. A specific second data medium, in addition, can be uniquely assigned to a specific first data medium through corresponding check data comprised in both data media. In this method a first data medium is always issued together with the assigned second data medium by an issuing site. The assignment can be programmed in the issuing site which issues the data media or can already be fixedly built-in by the manufacturer of the data media. The terminal can be obtained from any supplier since it does not contain any assignment data. Examples of issuing sites are banks, government offices, train or other transportation offices, telephone companies, retail stores, etc.

The second data medium thus forms an expansion or complementation of the terminal. The terminal preferably comprises a very simple nonspecific control circuit while all of the more complicated functions are only controlled by the, or a specific, second data medium connected to the terminal. If the first data medium is for example a bank card of the cited type with several memories, the terminal can be built such that therewith different operations can be carried out together with the bank card in order to be able, in principle, to use this bank card, thus to be able to enable, in particular, by means of the control elements, the transfer of an amount of money from the write-only memory into a memory to which only debits can be made. However, no fixed assignment to the terminal exists so that with any terminal built in this way the bank card can be used and, consequently, is not protected against loss. If such protection is desired by the user, he must insert a second data medium into the further receiving means of the terminal, and the second data medium and the first data medium used are assigned to each other via check data stored in both data media. A first data medium which contains such assignment via stored check data can no longer be used in that case without the second assigned data medium. In the event the first data medium is lost, it can not be used by the finder or a thief, which means that the amount of money stored in the first data medium cannot be disposed of.

Assigning a specific first data medium to a specific second data medium can be carried out in that both data media are issued together by the same issuing site, in particular by a client's bank, and both data media before they are transferred for example with the personalization of the first data medium, are programmed by the issuing bank for an assignment in that the associated check data are written, preferably irreversibly, into both data media. It is also conceivable that the issuing site receives already assigned pairs of first and second data media from the manufacturer of the data media. The first data medium in another option, could be set up such that it is initially usable with a terminal without a second data medium. As soon as this data medium is used for the first time with a terminal which comprises a second data medium, the first data medium can now only be used together with this second data medium so that the first data medium is now protected against misuse.

The fact that a first data medium can only be used with protection, i.e. with an associated second data medium, can be stored irreversibly in a specific memory element in the first data medium. This storage can take place automatically during the first use of the first data medium together with a terminal comprising the second data medium in a step in which the content of this memory element is irreversibly changed in a predetermined way. It is understood, that in that case the terminal must check this memory location each time a connection with the first data medium is established so that in the event the content indicates the assignment, no operations can be carried out without the second data medium.

Generating a fixed assignment between a first and a second data medium which is not defined by the site issuing both data media, is usefully carried out during the first connection of a first data medium with a terminal comprising a second data medium in that during this first connection the check data for both data media are generated and transferred to both data media and written into them. The generation of the check data is usefully performed by a random-number generator which can be comprised in one of the two data media or in the terminal. This generation, transfer and writing can be triggered automatically during the first connection or after a preceding actuation of the control elements of the terminal in a predetermined way, for example when a personal secret number is entered which is already stored in the first data medium.

The transfer of data between terminal and data media, or between the data media, largely takes place only after an actuation of the control elements of the terminal. In order to make improper manipulations during such data transfer as well as the unauthorized eavesdropping of the data transfer at least significantly more difficult, it is useful for the data to be transferred at least to the first data medium in encrypted form. This can take place with a key common to different first data media. However, it is useful if the encryption of the data is carried out using the check data alone or together with a further key. In this case the encryption takes place with each data medium individually.

If a first data medium with a fixed assignment to a specific second data medium is lost, no other person is able to dispose of the amount of money still contained therein in an unauthorized manner; yet this amount of money would be lost to the rightful user. In order to avoid this, it is useful, if following a modification or transfer to another memory location of data in the first data medium, a corresponding modification is triggered in the second data medium. Preferably this takes place without the participation of the terminal. In this way the second data medium contains a copy of at least the most important data of the first data medium. If this first data medium is subsequently lost, the rightful owner can document to his bank in conjunction with the second data medium, the amount of money still available on the first data medium so that he can be reimbursed for this amount of money. He will then be issued a new first data medium with this amount of money either together with an assigned second data medium, in particular if the assignment is programmed into the data medium by the bank or the first connection of a new first data medium with a terminal, which comprises the second data medium still in the possession of the rightful owner, establishes a new assignment whereby the new check data are generated and transferred and written into both data media. In addition, the copy stored in the second data medium is transferred to the new first data medium. The original first data medium is then finally no longer usable, not even by the rightful user if, for example, he has fraudulently pretended the loss of the original first data medium.

The cooperation of terminal and second data medium depends on the structure of the control circuits therein. For example, the terminal can comprise a microprocessor while the second data medium contains only some memory elements, in particular for holding check data and potentially the copy of the first data medium. In this case nearly all functions would be carried out by a microprocessor in the terminal which reads memory locations of the second data medium or writes into them only with specific steps. In the opposite case the second data medium comprises a microprocessor as well as correspondingly larger storage means while the terminal comprises only a very simple control circuit which essentially converts the actuation of the control elements into electrical signals, that is data, and specific received data into driving signals for the display elements. In this case many of the data or commands output during the discrete operations by the two data media are required directly by the particular other data medium. In a terminal with such simple structure it is useful if it has the capability to output only upon actuation of the control elements, data specifying only this actuation to at least one data medium and to display at least data selected from the data medium directly and nonprocessed and otherwise transfer only data output by the particular one data medium to the other data medium. In this way the simply built terminal functions in many operations only as the interface or connection between both data media. In addition, the user is ensured that the terminal, in particular if it is issued by any site, does not carry out any unnoticed manipulation of the transferred data, for example controls the transfer of an amount of money higher than that displayed from the write-only memory into a read-only memory so that a greater sum of money can be debited than the user has authorized. In order to check this, under specific circumstances if the first data medium is connected to a terminal comprising an assigned second data medium, an automatic dialogue between both data media can be triggered which proceeds for different pairs of assigned data media according to a different secret protocol and allows displays to be displayed on the terminal known only to the user. In this dialogue predetermined actuation of the control elements known only to the user can be drawn on and the dialogue can also proceed in somewhat modified form in successive operations. If in this dialogue the expected displays are displayed on the terminal, the user can be certain that he is using a faultless terminal.

A terminal which itself executes only a few very general nonspecific functions while the functions specific for the application are determined virtually completely by the second data medium, can be used by inserting different second data media for the most diverse applications. The terminal must have a specific spatial dimension in order to be able to accept the control elements, the display elements as well as the receiving means for the two data media. The second data media which potentially are different, in contrast, can be very small so that several second data media together require significantly less space than the terminal. In this way it is readily possible for a user to carry with him several data media simultaneously for different applications of the terminal. This applies to second data media which comprise galvanic coupling elements for establishing a connection to the terminal as well as also to such second data media which are coupled contact-free, for example inductively, with the data medium. If the terminal in the receiving means for at least the second data medium comprises contacts as well as also a contact-free interface, some of the second data media to be used can be provided with contacts while other second data media comprise an inductive interface. Both types of second data media can in that case be used with the same terminal. Different second data media, i.e. for different applications, can also have identical structure but differ with respect to programming. This is especially favorable if each data medium comprises a microprocessor whose program is stored in a memory which, for reasons of security, can preferably only be programmed once. This has the advantage over mask-programmed memories (firm-ware) that only one type of integrated circuit must be produced for all second data media, which makes the production cost-effective. The production becomes even more favorable if the first data media have the same structure as the second data media and differ from them also only by the programming of the memory for the microprocessors.

By having the capability when using the terminal of shifting significant functions into the second data medium and having them carried out by the second data medium, the application options of such a terminal together with a second data medium are nearly unlimited and by no means restricted to the use of bank cards. In addition, the application capabilities are further expanded if the terminal comprises an acoustic interface for data transfer. This permits using the terminal together with a corresponding second data medium for the data transmission between terminal and a remote computer via any telephone.

The invention further relates to a portable terminal for use in a system according to the invention as well as a data medium for use as the second data medium in a system according to the invention.

BRIEF DESCRIPTION OF THE DRAWINGS

In the following embodiments of the invention are explained in further detail in conjunction with the drawing, wherein:

FIG. 1 shows a terminal 1 in the form of a block which comprises. on the top side, buttons 2 as control elements as well as a display or display unit 3 with a set of display elements. The display can, for example, be an integral LCD display for several alphanumeric places. In practice the terminal can comprise rounded-off corners as well as a form different from a pure block.

Figure 1:
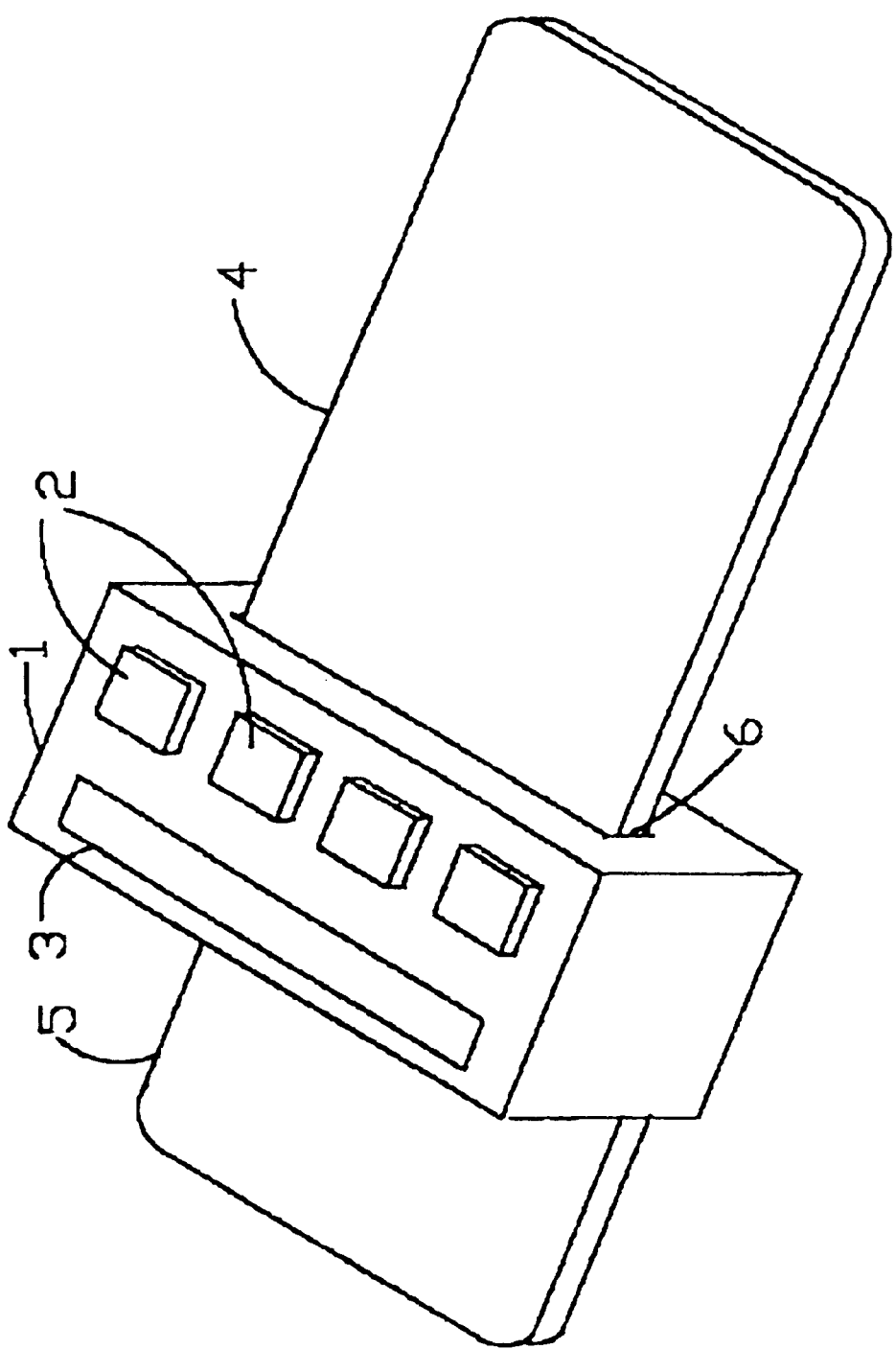
FIG. 1 a perspective view of a terminal with a first and second data medium.

The terminal 1 comprises two receiving means of which, in this perspective view, only the one receiving means 6 for a first data medium 4 is visible. The data medium 4 has preferably the form of a credit card. On the opposite side of terminal 3 is inserted a second data medium 5 in a further receiving means not visible in FIG. 1. This second data medium is here also represented in the form of a card, however, it is usually significantly smaller than first data media 4.

Figure 2:
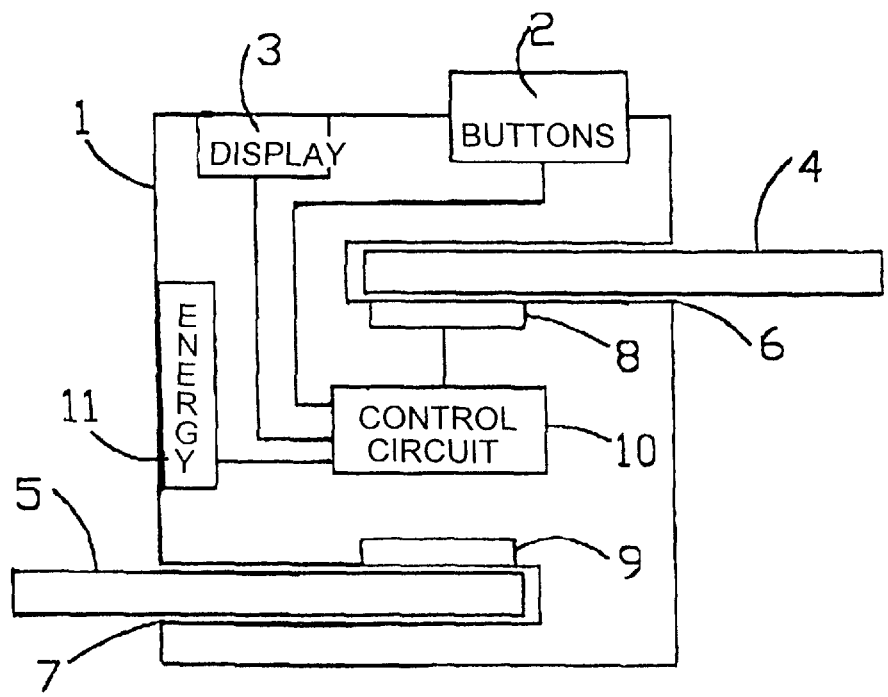
FIG. 2 a section through such terminal.

In FIG. 2 a section through the terminal with the two data media 4 and 5 is shown. On the top side are disposed the buttons 2 as well as display 3 which is connected through electric connections with a control circuit 10, preferably implemented as an integrated circuit. Terminal 1 comprises also an energy source 11 in the form of a replaceable or rechargeable battery. In the upper region of terminal 1 is provided receiving means 6 into which the first data medium 4 is inserted. On one side of the receiving means 6 a connection element 8 is disposed which comprises for example a number of contacts in a specific configuration. However, the connection element 8 can also be a send/receive antenna, for example in the form of a coil for an inductive contact-free interface for the transfer of data between element 8 and data medium 4. For reasons of clarity, in the data medium 4 the corresponding elements for the interface are not shown. Element 8 can comprise contacts as well as also a coil so that differently structured data media can be used.

In the lower portion of terminal 1 correspondingly further receiving means are provided for the second data medium 5. Here also on one side of a receiving means 7 an element 9 is disposed which can comprise contact elements for establishing electrical contact with corresponding (not shown) elements of data medium 5 or a send/receive antenna for a contact-free connection, or both.

Figure 3:
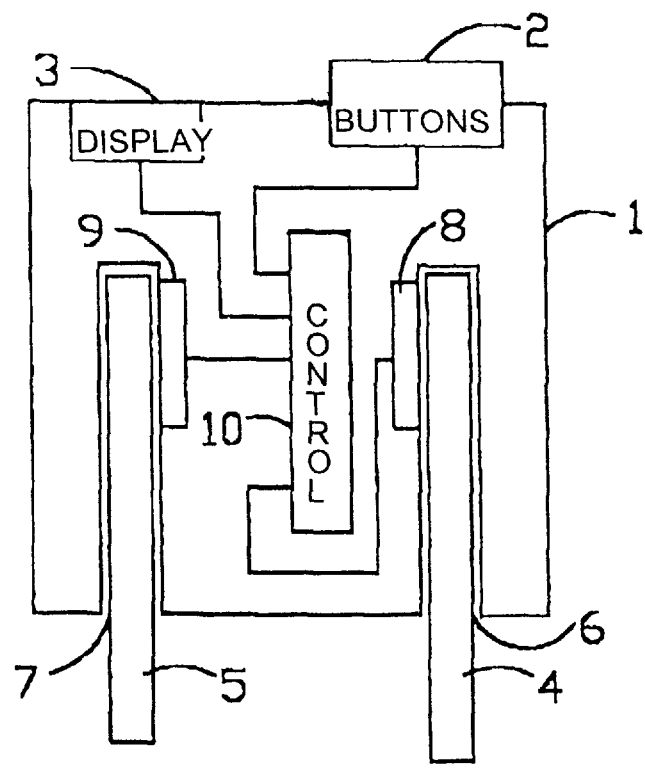
FIG. 3 a section through a terminal with slightly different structure.

FIG. 3 shows a section through a terminal 1 with a slightly different structure. Again, on the top side, buttons 2 are disposed as well as a display element 3, which are both connected to a control circuit 10. The receiving means 6 and 7 for the two data media 4 and 5 are provided on the opposing side, i.e. both data media are inserted into the terminal 1 from the same side. The energy source is here omitted for the sake of clarity. On one side of the receiving means 6 and 7, again, elements 8 and 9 are provided, as described in connection with FIG. 2, by which an operative connection between the control circuit 10 of terminal 1 and the data media 4 and 5 can be established.

Figure 4:
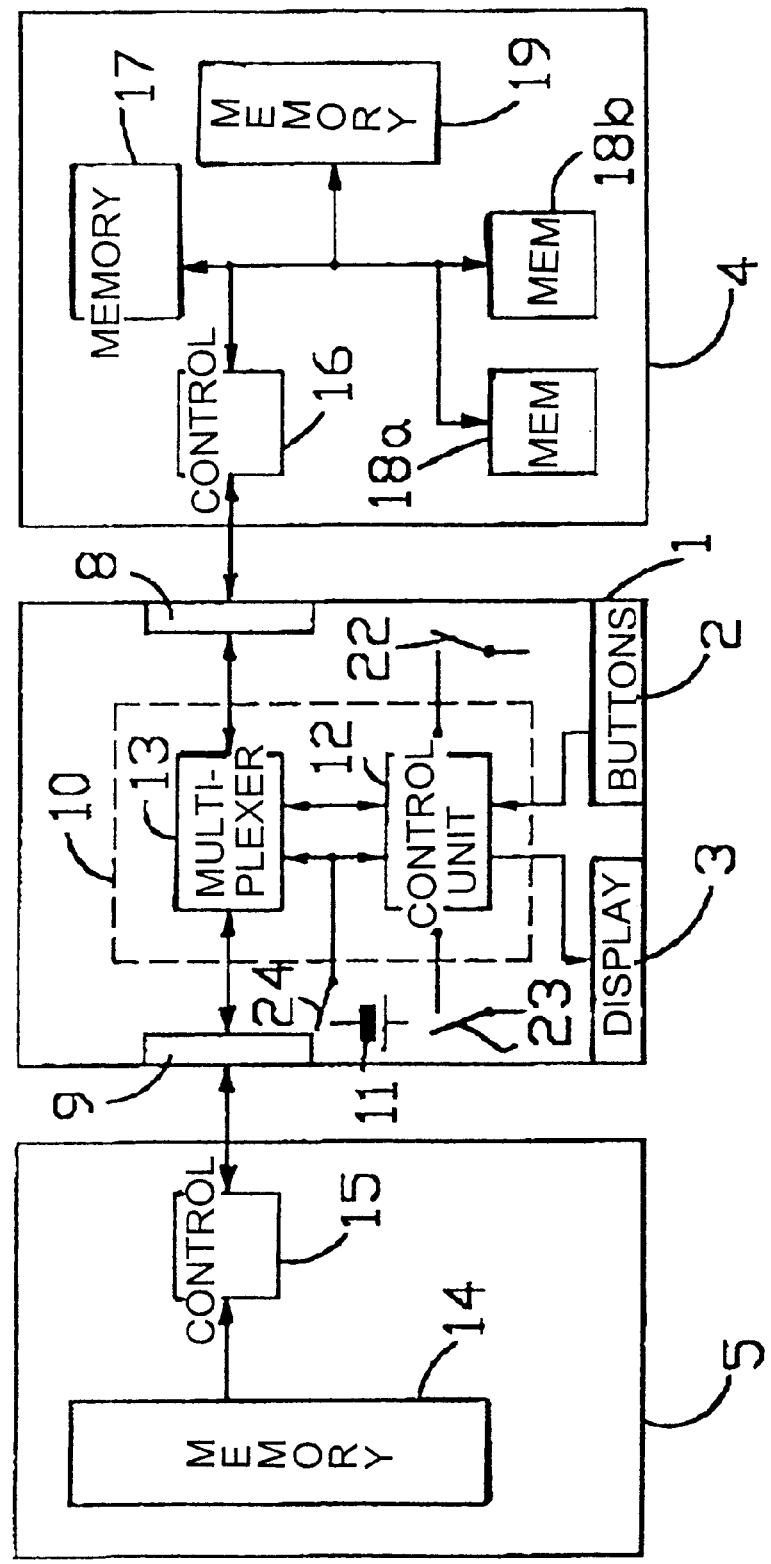
FIG. 4 a schematic block circuit diagram with the critical portions of the circuit in both data media and terminal.

FIG. 4 is a schematic block circuit diagram of the critical electronic elements in terminal 1 and the two data media 4 and 5 in connection. The second data medium 5 essentially comprises a control circuit 15, which is preferably implemented as a microprocessor, as well as a memory 14 from/into which the microprocessor 15 can read and write. As a function of the architecture of microprocessor 15, the memory 14 can also comprise, for example, two distinct memories with one memory comprising the program to be executed by the microprocessor 15 and the other memory containing data.

Microprocessor 15 is connected via the element 9 in terminal 1, which, with respect to the circuit diagram, can be considered to be an interface circuit with the control circuit 10 of terminal 1 in order to receive commands or data or to output commands or data. Control circuit 10 comprises a circuit section 13 which primarily has the function of a multiplexer in order to couple the interface 9 for the second data medium 5 with a corresponding interface 8 for the first data medium 4 or one of these two interfaces or both with a control unit 12. An energy source 11 in terminal 1 supplies, via a switch 24, the control unit 12 and, via the circuit section 13, the two data media 4 and 5 with the necessary operating voltage. Circuit section 13 is preferably controlled by control unit 12, and specifically as a function of commands which are received by data media 4 or 5, or as a function of the actuation of a button 2 or the position or change of position, of one of switches 22 or 23. These switches 22 and 23 indicate whether or not a data medium is inserted into associated receiving means 6 or 7. Switch 24 is preferably also closed by the insertion of the first data medium 4, since terminal 1 together with the second data medium 5 without the first data medium normally has no function. Through corresponding commands from data media 4 and 5 specific data can also be supplied to the display unit 3 via circuit section 13 and control unit 12.

In this example data medium 4 is a bank card such as was suggested in the above cited European Patent Application 97 100 003.9. It comprises a control 16, preferably in the form of a microprocessor as well as a memory 17 into which a disposable sum of money is written, as well as a memory 18a and 18b into which preferably fractions of the sum of money contained in memory 17 are transferred, which subsequently can be debited externally. Further, a memory 19 is present, which acquires or outputs data during specific operations. Writing a sum of money into memory 17 as well as debiting sums of money to memories 18a or 18b normally takes place not with terminal 1 but with other means, which is not of significance for the present invention and will therefore not be discussed further. With the aid of terminal 1 in the data medium 4 essentially the transfer of sums of money from memory 17 into a selected memory 18a or 18b is carried out. This takes place preferably in the following way.

It is assumed that terminal 1 contains a second data medium so that switch 23 is closed and that this second data medium is assigned to the first data medium in which a sum of money is to be transferred internally. As soon as this first data medium 4 is inserted into terminal 1, switch 22 and also switch 24 is closed so that now the circuits in the terminal and in both data media are supplied with voltage.

Upon switching on the voltage supply, the microprocessor 16 checks in data medium 4 automatically, or triggered by a command from control unit 12 in terminal 1, whether or not this data medium 4 can only be used in connection with an assigned second data medium. For this purpose a predetermined memory location in a program memory, assigned to the microprocessor 16 and here not shown separately, is read and its content compared with predetermined data. If the comparison shows that the first data medium 4 can only be used with an assigned second data medium, the microprocessor 16 reads from its program memory check data and transfers these via the interface circuit 8 in terminal 1 to the interface 9 for the second data medium 5. It is therein assumed that the circuit section 13 without special command as its normal position, couples the interfaces 8 and 9, otherwise the microprocessor 16 before the check data transfers a command which brings the circuit section 13 into this position. The check data are compared in the second data medium 5 by the microprocessor 15 with check data stored in memory 14 and if this comparison is positive the microprocessor 15 transfers further check data via the interfaces 9 and 8 to the first data medium 4 where these further check data are compared with stored further check data. Only if this further comparison is also positive does the microprocessor 16 transfer further data to terminal 1. These further data can be, for example, the content of memory 17 which in the data medium 5 is compared with a copy of this memory content in memory 14. In specific applications it can also be useful to represent this memory content additionally on the display 3.

A subsequent step can be that the microprocessor 16 supplies the content of an input memory, here not shown separately, in the first data medium 4 to terminal 1 and to the second data medium 5. These data are subsequently displayed on the display unit 3. If the content of memory 17 had previously been displayed on display unit 3, the transfer and display of the content of the input memory is triggered by actuating a button 2 in that this button actuation generates a command in control unit 12 and transfers this to data medium 4.

After the transfer of the content of the input memory, the user actuates a specific button 2 of terminal 1 whereby the control unit 12 transfers a corresponding command to both data media 4 and 5, which causes, in data medium 4, the decrease of the sum of money contained in memory 17 and the increase of the sum in a memory 18a or 18b, selected for example by button actuation on terminal 1; in the second data medium 5 the decrease of the present content of memory 17 by the amount contained in the input memory is carried out so that the new content of memory 17 in the first data medium 4 agrees again with the copy of this content in the second data medium 5. The user now removes the first data medium 4 from terminal 1 whereby the switch 24 is opened again and the voltage supply of the circuits in the discrete parts is interrupted, and uses data medium 4 in order to subtract, at a business location, the sum of money transferred to the selected memory 18a or 18b for the purchase of goods and services.

It should be noted that this represents only the description of one example of the application of terminal 1 with the data medium 5 together with the assigned data medium 4. Further security steps can additionally be provided. It can be provided, for example, that the transfer of a sum of money from memory 17 into one of memories 18a or 18b is only enabled by a command output by the second data medium 5, which for example depends also on a check of the selection of memory 18a or 18b. However, many other applications are also possible in which the second data medium carries out more extensive operations and checks of data transferred from the first data medium 4 and which potentially depend on the actuation of specific buttons 2 in terminal 1.

It is understood that the terminal 1 can have means to receive more than one second data medium 5 at the same time. Each second data medium is associated with one first data medium 4 which can be a different unique first data medium for that second data medium, or more than one second data medium can operate with a single first data medium.

While a specific embodiment of the invention has been shown and described in detail to illustrate the application of the principles of the invention, it will be understood that the invention may be embodied otherwise without departing from such principles.

What is claimed is:

1. A system comprising:
   a portable terminal having first and second receiving means for establishing an operative connection with portable first and second data media which are inserted into the respective first and second receiving means, control elements, display elements and a control circuit adapted to perform predetermined operations following an actuation of the control elements to transfer commands and/or data via the operative connection to the first data medium inserted in the receiving means and to receive data from the first data medium and to move selected data to the display elements,
   a portable first data medium for insertion into the first receiving means and comprising an electronic control circuit and storage means,
   a portable second data medium for insertion into the second receiving means and comprising an electronic control circuit and storage means, the second data medium being uniquely assigned to at least one specific first data medium of several data media via check data contained in the storage means of the first data medium and of the second data medium, the control circuit of the second data medium being adapted to cooperate with the control circuit of the terminal in order to transfer data and/or commands to the first data medium and to execute specific operations on data in the storage means of the first data medium only when said operative cooperation is established, with at least some of the operations being executable only if previously the assignment is checked via the check data and is found to be correct.

2. A system as stated in claim 1, in which the terminal has means for executing simple operations for conversion of actuations of the control elements into electrical signals and of supplied signals into driving signals for the display elements and for a direct transfer of the data output by one of the data media to the other data media, and all further operations are controlled only by the second data medium.

3. A system as stated in claim 2, wherein, after insertion of the first data medium into the terminal with said second data medium assigned to the first data medium, automatically a data exchange according to a secret protocol between both data media is triggered, during which, upon actuations of the control elements, predetermined data are transferred from at least one of the data media to the display elements of the terminal.

4. A system as stated in claim 1 wherein the generation of the check data comprised in the first data medium and in the second data medium for establishing the unique assignment takes place through programming devices equipped for this purpose at a site authorized to do so.

5. A system as stated in claim 1, wherein first operations between the terminal and the first data medium are enabled without the second data medium, which first operations were enabled before a first connection of the first data medium to the terminal, but after a first time connection of the terminal with the second data medium assigned to the first data medium, the first operations thereafter are only enabled if both data media are connected to the terminal.

6. A system as stated in claim 5, wherein with the second data medium inserted into the terminal, upon insertion of the first data medium the content of a predetermined memory element in the first data medium is checked and upon determining a first content, a command is transferred to the first data medium for writing a second content into the predetermined memory element, and upon determining the second content the predetermined assignment between first and second data medium is checked and the first operations are enabled only after a positive check.

7. A system as stated in claim 5, wherein the first time connection of a first data medium with a terminal comprising a second data medium triggers the generation and transfer of check data into both data media, and the writing therein.

8. A system as stated in claim 7, wherein the generation, transfer and writing of check data is triggered automatically.

9. A system as stated in claim 7, wherein the generation, transfer and writing is triggered according to a preceding predetermined actuation of the control elements of the terminal.

10. A system as stated in claim 1, wherein an actuation of the control elements triggers the transfer of encrypted data to at least the first data medium.

11. A system as stated in claim 10, wherein the check data are used for the encryption of data.

12. A system as stated in claim 1, wherein upon a modification or transfer of data in the first data medium triggered by actuating the control elements, a corresponding change in the second data medium is triggered.

13. A system as stated in claim 12, wherein, by the first-time connection of a new first data medium with a terminal comprising a second data medium, the transfer of data stored in the second data medium into the first data medium is triggered.

14. A system as stated in claim 1, wherein the terminal has means for transferring at least some data, transferred from the first data medium, into the second data medium.

15. A system as stated in claim 1, wherein the terminal has means for displaying data supplied by the second data medium.

16. A system as stated in claim 1, wherein the terminal comprises additionally an acoustic interface for data transfer.

17. A portable terminal for use in a system as stated in claim 1 comprising an electronic control circuit and storage means, with control elements, with display elements and with a control circuit for executing predetermined operations with said second receiving means for said second portable data medium comprising an electronic control circuit, storage means and an interface for establishing an operative connection with the control circuit and the storage means, whose control circuit has means to cooperate with the control circuit of the terminal to execute operations.

18. A portable terminal as stated in claim 17, wherein the terminal has means for only transferring data via the actuation of the control elements to at least one data medium inserted into the terminal and to display data output by at least one data medium without change by processing and to transfer data output by a data medium unchanged to the other data medium.

19. A data medium for use as a second data medium together with a terminal in a system as stated in claim 1 with an electronic control circuit, storage means and an interface for establishing an operative connection between the control circuit and the storage means of the data medium and the control circuit of the terminal, wherein the storage means comprise first check data via which the data medium is uniquely assigned to at least one specific first data medium of several first data media through the check data comprised in the specific further data medium, and the control circuit has means to cooperate with the control circuit of the terminal in order to execute operations in connection with a data medium inserted into the terminal, wherein at least some of the operations are only executed if previously the assignment has been checked via the check data and was found to be correct.

20. A data medium as stated in claim 19, including means for carrying out a predetermined data exchange with a first data medium connected with the terminal, in the course of which predetermined data are output to the display elements of the terminal after an operating voltage for the terminal has been switched on.

* * * * *